(12) United States Patent
Noda et al.

(10) Patent No.: US 7,450,810 B2
(45) Date of Patent: Nov. 11, 2008

(54) TWO-DIMENSIONAL PHOTONIC CRYSTAL CAVITY AND CHANNEL ADD/DROP FILTER

(75) Inventors: Susumu Noda, Uji (JP); Takashi Asano, Kyoto (JP); Yoshihiro Akahane, Itami (JP)

(73) Assignees: President, Kyoto University, Kyoto (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/537,663

(22) Filed: Oct. 2, 2006

(65) Prior Publication Data

US 2007/0086716 A1  Apr. 19, 2007

Related U.S. Application Data

(63) Continuation of application No. 10/708,618, filed on Mar. 16, 2004, now abandoned.

(30) Foreign Application Priority Data

Mar. 17, 2003  (JP) .............................. 2003-071947

(51) Int. Cl.
*G02B 6/10* (2006.01)
(52) U.S. Cl. ........................ 385/129; 385/130; 385/131; 385/132
(58) Field of Classification Search .......... 385/129–132
See application file for complete search history.

(56) References Cited

FOREIGN PATENT DOCUMENTS

JP  2002-365599 A  12/2002

OTHER PUBLICATIONS

Akahane, Yoshihiro et al., "Design of a channel drop filter by using a donor-type cavity with high-quality factor in a two-dimensional photonic crystal slab," Mar. 3, 2003, Applied Physics Letter, vol. 82, No. 9, pp. 1341-1343.*

Srinivasan, Kartik and Painter, Oskar, "Momentum space design of high-Q photonic crystal optical cavities," Jul. 29, 2002, Optics Express, vol. 10, No. 15, pp. 670-684.*

* cited by examiner

*Primary Examiner*—Frank G Font
*Assistant Examiner*—Jerry Blevins
(74) *Attorney, Agent, or Firm*—James W. Judge

(57) ABSTRACT

In 2D photonic crystals, cavities having a heightened Q factor are made available, wherein combining the high Q cavities with waveguides affords channel add/drop filters having high resolution. In a cavity constituted by a point defect within a 2D photonic crystal, the 2D photonic crystal is configured by an arrangement, in a two-dimensional lattice of points defined in a slab (1), of low-refractive-index substances (2) having a low refractive index relative to the slab (1) and being of identical dimension and shape. The point defect (4) contains a plurality of three or more lattice points that neighbor one another, and in these lattice points no low-refractive-index substances (2) are arranged; therein the dimension of the low-refractive-index substance (2) that should be arranged to correspond to at least one of the lattice points nearest the point defect (4) is dimensionally altered from a predetermined dimension.

12 Claims, 6 Drawing Sheets

TWO-DIMENSIONAL PHOTONIC CRYSTAL CAVITY AND CHANNEL ADD/DROP FILTER

BACKGROUND OF THE INVENTION

1. Technical Field

The present invention relates to cavities and channel add/drop filters employing photonic crystals (PCs), and in particular to improvements in the characteristics of cavities and channel add/drop filters based on two-dimensional photonic crystals.

2. Description of the Related Art

It should be understood that in the present specification, the significance of the term "light" is meant to also include electromagnetic waves that relative to visible light are of longer as well as shorter wavelength.

Along with advances in wavelength division multiplexed (WDM) optical communication systems in recent years, the importance of ultrasmall add/drop filters and channel filters in which enlarged capacity is being targeted is on the rise. In this area, then, attempts are being made to develop extraordinarily small-scale optical add/drop filters by employing photonic crystals. In particular, with photonic crystals novel optical properties can be realized by exploiting artificial periodic structures in which a crystal-lattice-like periodic refractive index distribution is artificially imparted within the parent material.

One important feature of photonic crystals is the presence of photonic bandgaps. With photonic crystals having three-dimensional refractive index periodicity (3D photonic crystals), perfect bandgaps in which the transmission of light is prohibited in every direction can be formed. Among the possibilities with these crystals are the local confinement of light, control of spontaneous emission, and formation of waveguides by the introduction of line defects, wherein the realization of ultrasmall photonic integrated circuits can be anticipated.

Meanwhile, studies into uses for photonic crystals having a two-dimensional periodic refractive-index structure (2D photonic crystals), are flourishing because the crystals can be manufactured comparatively easily. A periodic refractive-index structure in 2D photonic crystals can be formed by, for example, arranging in a square-lattice or triangular-lattice geometry air rods perforating a high-refractive-index plate material (usually termed a "slab"). Alternatively the structure can be formed within a low-index material by arranging, in a 2D-lattice geometry within the material, posts made of a high-refractive-index material. Photonic bandgaps can be produced from such periodic refractive-index structures, enabling the transmission of light traveling in an in-plane direction (a direction parallel to both the principal faces of the slab) to be controlled. Waveguides, for instance, may be created by introducing line defects into a periodic refractive-index structure. (See, for example, *Physical Review B*, Vol. 62, 2000, pp. 4488-4492.)

FIG. 10 illustrates, in a schematic oblique view, a channel add/drop filter disclosed in Japanese Unexamined Pat. App. Pub. No. 2001-272555. (In the drawings in the present application, identical reference marks indicate identical or equivalent parts.) The channel add/drop filter in FIG. 10 exploits a 2D photonic crystal having, configured within a slab 1, cylindrical through-holes 2 of identical diameter (ordinarily occupied by air) formed at the vertices of a 2D triangular lattice. In a 2D photonic crystal of this sort, light is prohibited from propagating in an in-plane direction within the slab 1 by a bandgap, and in the direction normal to the plane (direction orthogonal to the two principal faces of the slab) is confined due to total internal reflection occurring at the interface with the low-refractive-index clad (air, for example).

The photonic crystal in FIG. 10 contains a waveguide 3 consisting of a straight line defect. This straight-line defect 3 includes a rectilinearly ranging plurality of lattice points adjoining each other, with the through-holes 2 missing in these lattice points. With light being able to propagate through defects in the 2D photonic crystal, the straight-line defect can be employed as a linear waveguide. With linear waveguides, the spectrum of wavelengths in which light can be transmitted at low loss is comparatively broad; consequently light in a wide range of wavelengths containing signals in a plurality of channels may be propagated through such waveguides.

It will be appreciated that the width of straight-line defects as waveguides can be altered variously in accordance with the requisite characteristics. The most typical waveguide is obtained, as described above, by leaving through-holes missing in one row in the lattice-point lines. Nevertheless, waveguides can also be created by leaving through-holes missing in a plurality of neighboring rows in the lattice-point lines. Moreover, a waveguide is not limited in width to integral multiples of the lattice constant, but may have an arbitrary width. For example, it is possible to create a waveguide having a width of choice by relatively displacing the lattice on either side of a linear waveguide to the distance of choice.

The photonic crystal set out in FIG. 10 also contains a cavity 4 consisting of a point defect. The point defect 4 contains a single lattice point, and through that lattice point a through-hole that is of large diameter as compared with the other lattice points is formed. A defect in this way containing a relatively large-diameter through-hole is generally termed an acceptor-type point defect. On the other hand, a defect in which a through-hole is missing in a lattice point is generally termed a donor-type point defect. The cavity 4 is disposed adjacent the waveguide 3, within a range in which they can exert on each other an electromagnetically reciprocal effect.

In a 2D photonic crystal such as that illustrated in FIG. 10, if light 5 containing a plurality of wavelength ranges ($\lambda_1, \lambda_2, \ldots \lambda_i, \ldots$) is introduced into the waveguide 3, light that has the specific wavelength $\lambda_i$ corresponding to the resonant frequency of the cavity 4 is trapped in the cavity and while resonating in the interior of the point defect, light 6 of wavelength $\lambda_i$ is emitted in the normal direction, in which the Q factor originating in the finite thickness of the slab 1 is small. This means that the photonic crystal in FIG. 10 can be employed as a channel drop filter. Conversely, by shining light into the point defect 4, in the direction normal to the slab 1, light of wavelength $\lambda_i$ that resonates within the cavity 4 can be introduced into the waveguide 3. This means that the photonic crystal in FIG. 10 can also be employed as a channel add filter. It will be appreciated that the transfer of light between either the waveguide 3 or the cavity 4 and the exterior can be made to take place by proximately disposing an optical fiber or an optoelectronic transducer in the vicinity of the waveguide end faces or the vicinity of the cavity. Of course, in that case a collimating lens (collimator) may be inserted in between either the waveguide end face or the cavity, and the optical-fiber end face or the optoelectronic transducer.

In an optical add/drop filter such as that illustrated in FIG. 10, by appropriately configuring the spacing between the waveguide 3 consisting of the line defect and the cavity 4 consisting of the point defect, the ratio of optical intensities in a specific wavelength that is transferred between the waveguide and the cavity can be controlled. Also in FIG. 10, since no asymmetry is introduced with respect to the point defect 4 in the direction normal to the slab 1, light is output in both vertical directions from the point defect 4; but it is possible to make the output of light be in only one or the other vertical direction by introducing asymmetry in the point defect 4 in the plane-normal direction. An example of a mechanism that can be utilized to introduce this sort of asymmetry is a method in which the diameter of the point defect 4, which is round in section, is made to vary continuously or discontinuously along the thickness of the slab. With further regard to FIG. 10, although the channel add/drop filter in the figure contains only a single cavity, it will be readily understood that by disposing along the waveguide a plurality of cavities differing from one another in resonant wavelength, optical signals in a plurality of channels can be added/dropped.

With the Q factor of a cavity employing an acceptor-type point defect such as disclosed in Japanese Unexamined Pat. App. Pub. No. 2001-272555 being around 500, the full width at half-maximum (FWHM) in the peak-wavelength-including light output from a cavity of this sort is around 3 nm.

However, using multi-channel signals for WDM communications at about 100 GHz with a wavelength-peak spacing of approximately 0.8 nm is being investigated. This means that with a cavity such as disclosed in Unexamined Pat. App. Pub. No. 2001-272555, the largeness of the Q factor is insufficient, and with the 3-nm FWHM, the cavity is totally inadequate for separating from one another multi-channel signals whose peak-wavelength spacing is approximately 0.8 nm. In short, there is a need to raise the Q factor of cavities employing 2D photonic crystals, to reduce the FWHM of the peak-wavelength spectra they output.

Prior art cavity-tuning methodologies include that taught by Kartik Srinivasan and Oskar Painter in "Momentum space design of high-Q photonic crystal optical cavities," *Optics Express*, Vol. 10, No. 15, Jul. 29, 2002, pp. 670-684. On page 673, section 3, line 3, Srinivasan and Painter state, "the geometry of the defect and the surrounding holes can be tailored to reduce . . . [radiation loss]," (that is, to raise the Q value). Srinivasan and Painter teach modifying defect geometry in three specific ways: (1) as illustrated in the left-most column of Table 6 on page 679; (2) as illustrated in the left-most column of Table 7 on page 680; and (3) as illustrated in FIG. 7(a) on page 682. In the first instance, the defect geometry is designed by enlarging the radius of the single hole constituting the defect. In the second, each of the pair of defect-constituting holes about common center e is reduced in diameter. While in the first two examples, the geometry of the lattice holes surrounding the point defect is unaltered, in the third example—a modification of the second—holes neighboring the defect are altered to create a "graded lattice." Specifically, the immediate-neighbor holes are enlarged in radius, and "[t]he hole radii are then increased parabolically outwards for 5 periods in the x̂-direction and 7 periods in the ŷ-direction, after which they are held constant (page 683, lines 2-4).

The gradating of the lattice by parabolically altering the dimension of the holes outwards for several periods from the defect is based on a methodology that precedes the Srinivasan paper. That is, what led Srinivasan and Painter to hit upon their graded cavity structure is based on the perturbation theory. The theory is one according to which, starting from a photonic crystal slab, a cavity configuration is determined by treating the introduction of a defect as a perturbation in the dielectric, and then performing a Fourier transform on the perturbation to evaluate, in a process of trial and error, whether the "leaky cavity modes" have increased. Yet a guide to approaching where and in what way is best to alter the cavity structure cannot by obtained from this technique. In other words, the result of trial and error is for the most part fortuitous; moreover, a cavity having a high Q value can only be obtained by altering the geometry of extraordinarily many air holes.

In sum, the graded cavity is designed using the perturbation theory, and accordingly, Q can only be increased by, for the most part, chance—and moreover, only by altering the size of a very large number of air holes.

A further consideration is that Srinivasan and Painter are concerned with minimizing the mode volume to the extent possible—that is, "modal volumes approaching the theoretical limit of a cubic half-wavelength" (Introduction, end of first paragraph). In particular, the Srinivasan and Painter paper is directed to PC optical microcavities having "very small mode volumes and loss properties sufficient to sustain lasing" (Introduction, second paragraph, referring to an earlier study by Painter et al.) Clearly, Srinivasan and Painter is concerned with active devices; in addition to mentioning lasers in the introduction, Srinivasan and Painter later mention "resonators."

Thus, a design constraint on a defect cavity according to Srinivasan and Painter presents itself. That is, in order to minimize the defect mode volume so as to "approach the theoretical limit of a cubic half-wavelength," a point-defect according to Srinivasan and Painter must be designed according to the perturbation theory. That is why, ultimately, Srinivasan teaches only two defect geometries, that of Table 6 and that of Table 7 in the Srinivasan and Painter paper. In both cases, the dimension of the defect-constituting hole(s) is altered. In the former case, the defect is constituted by a single hole that is enlarged diametrically; in the latter, the defect is constituted by a pair of holes centered on the defect's origin point and reduced diametrically. (It is to be noted that the latter cavity structure is also a single-point based defect geometry.)

PC devices according to Srinivasan and Painter—that is, PC resonators, as noted earlier—are limited to being constituted by the point defect geometries of Table 6 and Table 7 in the Srinivasan and Painter paper—that is, to geometries of enlarging a single defect-constituting hole, or reducing twinned defect-constituting holes, in order to achieve the mode-volume minimization necessary for the functioning of the resonators.

Akahane et al., "Design of a channel drop filter by using a donor-type cavity with high-quality factor in a two-dimensional photonic crystal slab," *Applied Physics Letters*, Vol. 82, No. 9, Mar. 3, 2003, pp. 1341-1343, is a paper directed to PC channel add/drop filters for wavelength-division multiplexed (WDM) optical communication systems. The paper notes that devices utilizing acceptor-type defects do not achieve Q high enough to provide the filtering resolution required for WDM applications, and that meanwhile researchers have concentrated efforts on improving the Q of defect cavities alone (rather than the Q of the cavity-waveguide system as a whole, functioning as a filter). Akahane et al. then references Vu čkovićet al. ("Design of photonic crystal microcavities for cavity QED") and another paper to point out that In such studies, the combination of the high Q factors and small mode volumes are considered very important since the goal is to realize high performance active light-emitting devices such as zero-threshold lasers, etc.

In the sentence succeeding the above-quoted sentence, Akahane et al. then add, However, the requirement for the mode volume size is not essential for this channel add/drop filter [that is, the channel add/drop filters that are the focus of the Akahane et al. paper] since it is a passive device, as long as the cavity is single mode for the concerning [sic] spectral range . . . . Instead we must consider the interaction between the defect cavity and the line defect waveguide.

(Emphasis added.)

Hence, the authors of the Akahane et al. paper realized that passive PC devices have different design requirements from those of active devices—in particular that the mode volume limitations are not as severe—and determined to "investigate various donor defects with one to three missing holes which are filled with the same dielectric substance as the slab."

Akahane et al.'s "L2" and "L3" defects, formed respectively by two missing air holes and three missing air holes, when tested in isolation (not in combination with waveguides) each demonstrated an approximately four-fold increase in Q over the defect with one fewer missing air hole. Then, referring to FIG. 2, the second column on the second page of the Akahane et al. article discusses the relationship between Q, as given by in-plane Q and vertical Q, and the separation between the defect cavity and a waveguide as constituents of a filtering device.

The Akahane et al. results seem to suggest that in applications in which the greater mode volume does not preclude a functioning device, the higher Q gained is advantageous. In particular, Akahane et al. found that the L3-based devices have very high filtering resolution and useful polarized emission characteristics.

Akahane et al. evaluated the Q of L2 and L3 (as well as L1) defect cavities in isolation, and the Q of the cavities combined with waveguides to function as filters. Regarding L2 and L3 defect cavities in isolation, Akahane et al. is completely silent as to how the Q of the cavities might be improved—in particular, Akahane et al. is totally silent about modifying the geometry of defect-surrounding holes. On the other hand, Akahane et al. does investigate and discuss how the (L3) cavity-to-waveguide separation can improve Q.

To enhance the Q of the cavities to which their research is directed, Srinivasan and Painter in the first place alter (perturb) the geometry of the single-point defects themselves. To enhance the Q further while preserving the minimal mode volume of the single-point cavities, Srinivasan and Painter then apply the known methodology of tailoring the geometry of the defect-surrounding holes—specifically, they parabolically gradate the size of the holes for several defect-concentric periods by enlarging the holes' radii.

As is clear from the Srinivasan and Painter discussion, on page 683 of their paper, of their "chosen lattice," the relationship between the altered size of the defect-constituting hole(s) and of the size of the holes in the surrounding graded lattice is critical. (They mention that the relationship acts "as a potential well [to] confine the mode in real space.)

While Akahane et al. measures the Q of an L3 defect, the reference is silent on improving the Q of a cavity constituted by the defect. Moreover, the methodology utilized by Srinivasan and Painter is inapplicable to an L3 defect according to Akahane et al., in the first place because the defect-constituting holes are filled; the defect is constituted simply by a run of missing holes, not by altering the size of a hole on a single point or of a twinned pair about a single point. The defect-hole/defect-surrounding-hole relationship crucial to improving Q in Srinivasan and Painter is not even available for improving the Q of cavity according to Akahane et al.

BRIEF SUMMARY OF THE INVENTION

A principal object of the present invention, in view of the situation with the conventional technology, is to afford a high-Q cavity within a 2D photonic crystal, and furthermore to combine such a cavity with a waveguide to make available a channel add/drop filter having high wavelength resolution.

A cavity made from a point defect within a two-dimensional photonic crystal in accordance with the present invention—the 2D photonic crystal being configured by an arrangement, in a two-dimensional lattice of points defined in a slab, of low-refractive-index substances having a low refractive index relative to the slab and being predetermined identical dimension and shape—is characterized in that the point defect contains a plurality of three or more lattice points that neighbor one another, and in these lattice points no low-refractive-index substances are arranged, and in that the low-refractive-index substance that should be arranged to correspond to at least one of the lattice points nearest the point defect is dimensionally altered from the predetermined dimension.

Here, the low-refractive-index substance that would otherwise be arranged to correspond to at least one of the lattice points secondarily adjacent the point defect may be dimensionally altered from the predetermined dimension. Preferably, furthermore, the point defect contains six or fewer of the lattice points. The wavelength of light that resonates in the cavity is adjustable in dependency upon the dimension and shape of the point defect, or may be adjusted by changing the lattice constant of the photonic crystal. It is preferable that the point defect contain the plurality of lattice points lined in a line segment.

The low-refractive-index substances can be filled into columns perforating the slab. The points in the two-dimensional lattice preferably are arrayed in a triangular lattice. The slab preferably has a refractive index of 2.0 or greater.

A channel add/drop filter in accordance with the present invention, including one or more cavities as in the foregoing, includes one or more waveguides made from a line defect within the two-dimensional photonic crystal, and is characterized in that the cavity is disposed adjacent the waveguide, within a separation in which between them an electromagnetically reciprocal effect is produced. By containing a plurality of cavities that differ from one another in resonant frequency, a channel add/drop filter of this sort can function as a channel add/drop filter for multi-channel optical communications.

Summarizing the structure of a point-defect cavity of the present invention—namely, altering the size of holes that are nearest neighbors to a point defect—points out, first of all, utter difference from the graded cavity of FIG. 7(a) in Srinivasan and Painter. Thus, the concept by which the point-defect cavity structure was arrived in the present invention is quite different from that which led to the cavity geometry of the Srinivasan and Painter configurations.

The idea that increasing Q value is possible simply by altering the size of the nearest—neighbor holes—a key discovery of the present invention—could not be surmised in the least by design methods relying on the perturbation theory alone. Furthermore, inasmuch as the perturbation theory is not applicable to the point-defect cavity of Akahane et al., the present invention cannot be derived from concepts utilizing the perturbation theory. The present-invention PC cavity design technique involving the alteration of nearest-neighbor hole diameter was conceptualized through an idea completely separate from the graded cavity concept. Thus the Srinivasan and Painter defect geometries totally differ from the defect geometry of the present invention.

Now this discussion will look at a specific comparison. The cavity geometry of the present invention is tantamount to one in which, with a defect in which three or more holes are filled (e.g., defect L3 in the Akahane et al. paper from *Applied Physics Letters*) as a base, "the geometry of the surrounding holes has been tailored." Of the three types of defects set forth in the Srinivasan and Painter paper, the one that corresponds to a defect structure in which "the geometry of the surrounding holes has been tailored" is the structure of FIG. 7(*a*), but that defect configuration is, in the first place, a structure realized by the graded alteration of the size of very many holes.

In contrast, the defect structure of the present invention requires only that the holes that are varied in diameter be those that are nearest neighbors to the point defect, which differs completely from the graded-cavity structure of FIG. 7(*a*) in Srinivasan et al. Put another way, the structure that would be produced from merely combining the knowledge of Srinivasan et al. with the knowledge of Akahane et al. would be an L3-defect graded cavity, which is completely different from the defect structure of the present invention. In short, to a person skilled in the art who has learned both the knowledge in Srinivasan et al. and the knowledge in Akahane et al., the defect structure of the present invention could not be arrived at without inventive effort.

Also, the reason why the defect structure of the present invention differs completely from a graded cavity structure—that is, the reason giving rise to the differences as to the number holes that are altered in size, and as to the presence/absence of a graded configuration—is because the idea leading to the present invention is totally different.

Thus, the concept of realizing a high-Q nanocavity simply by changing the size of the nearest-neighbor as well as the second-nearest-neighbor air holes would not come to mind from design techniques based on the perturbation theory. In the Srinivasan and Painter instance, actually, the structure that happened to prove satisfactory was ultimately a graded cavity structure, differing completely from alteration in the size of the defect's nearest-neighbor holes. To elaborate further, the perturbation theory only holds when extent of perturbation is slight. In other words, to perturb a point defect of the present invention would require impracticable perturbation to the size of the filled or missing holes.

Thus, inasmuch as this theory cannot be applied to a defect according to the Akahane et al. paper—that is, a defect in which the air holes are completely filled—the defect configuration of the present invention could not be produced from this theoretical construct.

Moreover, it should now be rudimentarily clear that a defect in which the air holes are completely filled does not allow of designing based on perturbations—changes in size of—those holes, and consequently, the Srinivasan and Painter methodology is inapplicable to tailoring missing-hole defect geometries for enhanced Q. On the contrary, the present invention was derived from a totally different concept, the significance of which will be elaborated below.

In order to find the best approach to designing a high-Q cavity structure, the present inventors thought to delve into the electric-field profile of a photonic crystal nanocavity, and as a result discovered what sort of electric-field profile is optimal for enhancing the Q of such a nanocavity. The details of that discovery are as presented in Yoshihiro Akahane et al., "High-Q photonic nanocavity in a two-dimensional photonic crystal," *Nature*, vol. 425, 30 Oct. 2003, pp. 944-947—the entirety of which is hereby incorporated by reference herein—and the present invention is the exploitation of that discovery. (Although the publication date of the *Nature* article is after the filing date of the parent application to which the present application claims domestic priority, the present incorporation by reference is of nonessential subject matter—indeed, the *Nature* article is not a U.S. patent or application—and as such should have no bearing on the effective filing date of the present application.)

Specifically, the reasons for the limitations on the Q of—that is, the reasons that light leaks from—a cavity in which three air holes in a line are filled were initially examined. From looking at the electric-field profile of the cavity, it was in the first place apparent that the profile was close to that of a one-dimensional cavity oscillating longitudinally. Given the nature of the electric-field profile, a one-dimensional model of the cavity was utilized to examine the mechanism behind the cavity's electromagnetic radiation loss. As a result of a Fourier transform analysis done on the cavity electric-field profile to investigate where the leaky modes are produced, abrupt change/attenuation of the electric field at the ends of the cavity was identified as the source. With this as a hint, thought was given to an electric-field profile whose envelope function constituted a Gaussian (normal) distribution as, conversely, a gentle electric-field profile in which there was no abrupt change. On carrying out a Fourier transform analysis, it was discovered that a cavity whose electric-field profile had a Gaussian envelope produced almost no leaky modes. Thus, the inventors succeeded in freshly discovering the crucial design principle that to enhance the Q of a photonic nanocavity, the electric-field profile's envelope function determined by the cavity geometry should be close to that of a function whose changes are gentle (most ideally, a Gaussian distribution).

The electric-field profile of a cavity made by filling three air holes in a line was analyzed following the foregoing indicators, which confirmed that the profile's envelope function abruptly attenuates in the cavity ends. That is, it was understood that with a cavity of this structure as well, the abrupt change/attenuation in the electric-field profile proves to be the causative factor that increases optical leaky modes and lowers Q. The electric-field profile abruptly attenuating at the cavity ends is, in other words, tantamount to a situation in which the reflection at the cavity ends is overly strong—as though there were totally reflecting mirrors at the cavity ends. Given this realization, a study into moderating and mollifying the reflection at the cavity ends was conducted.

"Reflection" herein is equivalent to the overlapping of partial reflections from the periodically arranged air holes—that is, it is equivalent to Bragg reflection. For that reason, if the air holes at the ends of the cavity are made smaller, the partial reflection from the air holes will weaken, whereby reflection at the cavity ends would be expected to weaken. Thus, the inventors arrived at the idea of reducing ever so slightly the size of the air holes located at the cavity ends. Actually reducing the size of the air holes mollified the reflections, made the approach of the envelope function close to a Gaussian distribution evident, and succeeded in enhancing the Q of the cavity.

As discussed in the foregoing, the dominant advantage of the cavity design principles that the inventors discovered and brought forth is that the cavity structure can be designed simply by looking at the electric-field profile, wherein the inventors immediately understood in which part of the cavity the size of the holes should be altered. With the benefit of that knowledge, they came to the present realization that the Q could be heightened by varying the size of the nearest-neighbor or second-nearest-neighbor air holes.

Furthermore, in the present invention, the fact that the number of holes whose size is altered is slight compared with a graded cavity is desirable from both design and fabrication standpoints. On page 684 at the end of their paper, Srinivasan and Painter write,

[R]educing the mode volume may be of importance to applications in quantum optics, while reducing the complexity of the design (in terms of the number and size of holes comprising the defect) may be of interest from a fabrication standpoint. The approach to such designs can be aided through the Fourier space consideration of the dielectric perturbation as has been described in this section.

As has been set forth above, the present invention is a realization of that goal of reducing the complexity of the design, but by a Q-enhancing methodology totally different from that as taught by Srinivasan and Painter: a methodology unique to the special cavities of the present invention—cavities of three or more adjacent holes that are filled, or "missing." Moreover, nowhere in Akahane is there any teaching or suggestion with regard to improving the Q of a donor-type defect cavity defined by three or more missing air-holes. The present invention as claimed achieves such improvement, despite the silence of Akahane on the subject.

In the present invention, the defect is constituted by a plurality of three or more missing holes "of identical dimension and shape" to that of the rest of the holes in the lattice, except for the defect-surrounding holes whose dimension is altered according to the invention.

In sum, a defect according to the present invention is formed merely by leaving holes missing, not by altering the dimension of the defect-constituting holes. Therein Q is improved by the dimensional alteration of at least one nearest-neighbor defect surrounding hole (not any defect-constituting, missing hole), or by that alteration plus an alteration to a hole or holes immediately surrounding the nearest-neighbor holes.

Nowhere does Srinivasan teach or suggest that the graded-lattice tuning of the defect cavities that are the necessary subject of their research would work on a defect that is not formed by a perturbation. The present invention is a completely different, novel approach to improving the Q of a PC cavity—an approach necessitated by the totally different nature of the defect configuring that cavity according to the invention.

From the following detailed description in conjunction with the accompanying drawings, the foregoing and other objects, features, aspects and advantages of the present invention will become readily apparent to those skilled in the art.

DETAILED DESCRIPTION OF THE INVENTION

Figure 10:
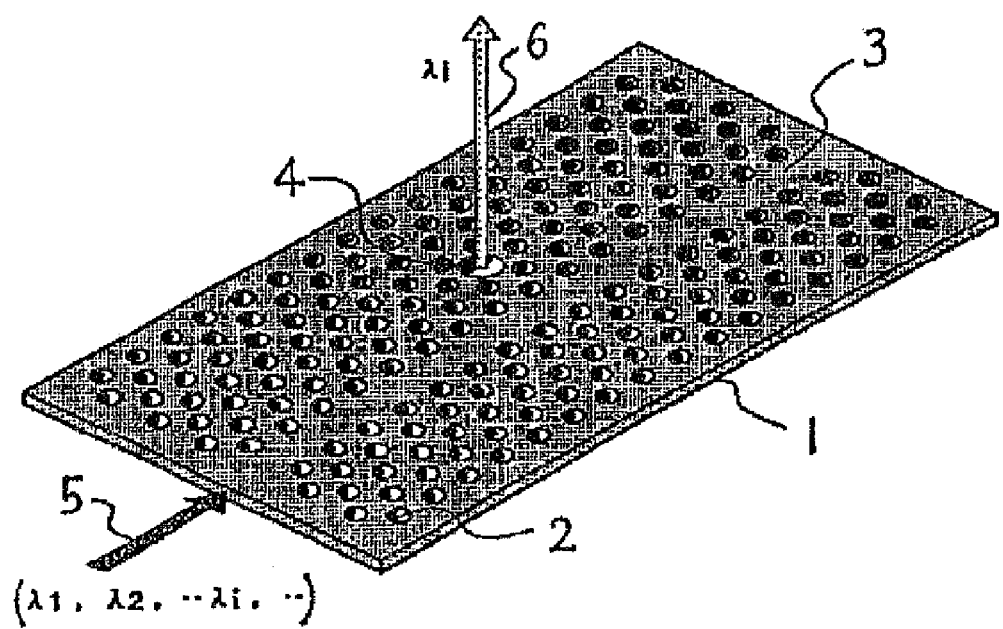
FIG. 10 is a schematic oblique view illustrating a channel add/drop filter employing a 2D photonic crystal according to the prior art.

Initially the present inventors looked into the characteristics, within a 2D photonic crystal, not of a cavity consisting of an acceptor-type defect as in FIG. 10, but of a cavity consisting of a donor-type point defect. As described earlier, donor-type defects contain one or more lattice points, and through-holes are missing in those lattice points.

What has chiefly been studied to date are point defects containing only a single lattice point, from the perspectives that owing to their structural simplicity they are easily analyzed electromagnetically and that they are of minimal size. This has meant that with donor types as well, point defects that contain a plurality of lattice points have not to date been studied extensively. Given the circumstances, then, the present inventors investigated the characteristics of donor-type point defects that contain a plurality of lattice points.

Figure 11A:
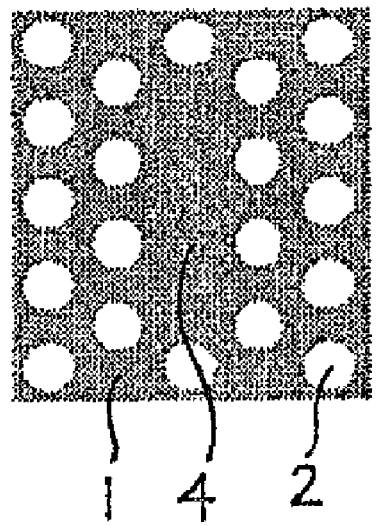
FIGS. 11A and B are schematic plan views representing examples of donor-type point defects that contain a plurality of lattice points, in a 2D photonic crystal.
Figure 11B:
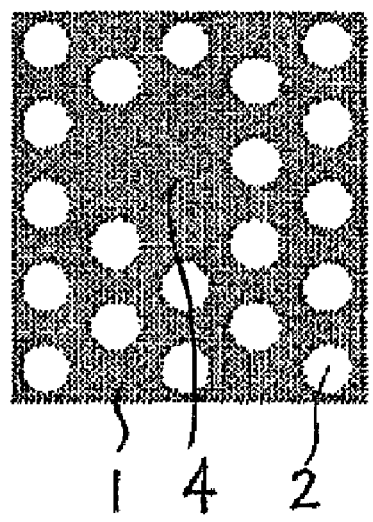

FIG. 11 is a schematic plan view representing a portion of a 2D photonic crystal including a donor-type point defect that contains a plurality of lattice points. In this 2D photonic crystal, through-holes 2 are provided at the vertices of a triangular lattice configured within a slab 1. Point defect 4 in FIG. 11A contains three lattice points neighboring one another in line-segment form, with no through-holes 2 being furnished in these lattice points. Meanwhile, point defect 4 in FIG. 11B contains three lattice points neighboring one another in a triangular geometry, with no through-holes 2 being furnished in these lattice points. In other words, the point defect 4 can be formed to contain a plurality of lattice points neighboring one another one-dimensionally, or may be formed to contain a plurality of lattice points neighboring one another two-dimensionally.

Using the widely known finite-difference time-domain (FDTD) method (see Japanese Unexamined Pat. App. Pub. No. 2001-272555), the present inventors carried out electromagnetic analyses on donor-type defects containing a plurality of lattice points, wherein they found that compared with cavities consisting of donor-type point defects that contain one or two lattice points, high Q values are obtained with cavities consisting of donor-type point defects that contain three or more lattice points. Nevertheless, if the number of lattice points that are contained in the point defect is too large, the number of resonant modes will be undesirably many, thus the number of lattice points preferably is six or fewer.

For example, with a cavity as is represented in FIG. 11A, in the simple base structure, Q=5200, and when compounded with a waveguide the filter is able to yield a Q factor of about 2600, with the FWHM of the light output from the cavity being approximately 0.6 nm. Still, taking into account crosstalk in WDM optical communication that employs multi-channel signals at about 100 GHz with a wavelength-peak spacing of approximately 0.8 nm, further improvement in Q factor is to be desired.

Figure 1:
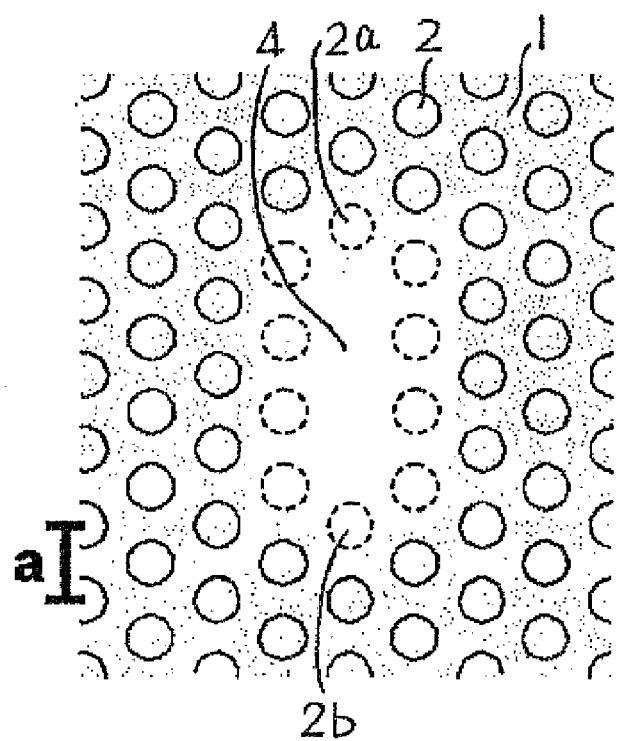
FIG. 1 is a schematic plan view for explaining principal features in one example of a cavity in a photonic crystal according to the present invention.

FIG. 1 is a schematic plan view for explaining principal features in one example of a cavity as defined by the present invention. A two-dimensional lattice of triangular vertices is defined in this 2D photonic crystal in FIG. 1, and round tubular through-holes 2 of predetermined identical diameter are formed at the lattice points. The spacing between adjacent-most lattice points in (the lattice constant of) the triangular lattice is indicated by a. The donor-type point defect 4 illustrated in FIG. 1 contains three lattice points neighboring one another and ranging in a line-segment formation; the through-holes 2 are missing in these lattice points.

A principal feature with the donor-type point defect 4 according to the present invention is that the size of at least one of the through-holes 2 nearest the point defect (the holes represented by dashed lines in FIG. 1) is reduced or enlarged relative to the other through-holes.

The Q factor and electric field pattern (radiation pattern) for a cavity made from a donor-type point defect 4 as is illustrated in FIG. 1 were simulated by the FDTD method. The simulation parameters were configured by selecting silicon for the slab 1; and setting approximately 1.55 µm, which is generally used in optical communications, for the wavelength λ; 0.42 µm for the lattice constant a; 0.6 a for the slab 1 thickness; and 0.29 a for the predetermined sectional radius of the through-holes 2.

Figure 2:
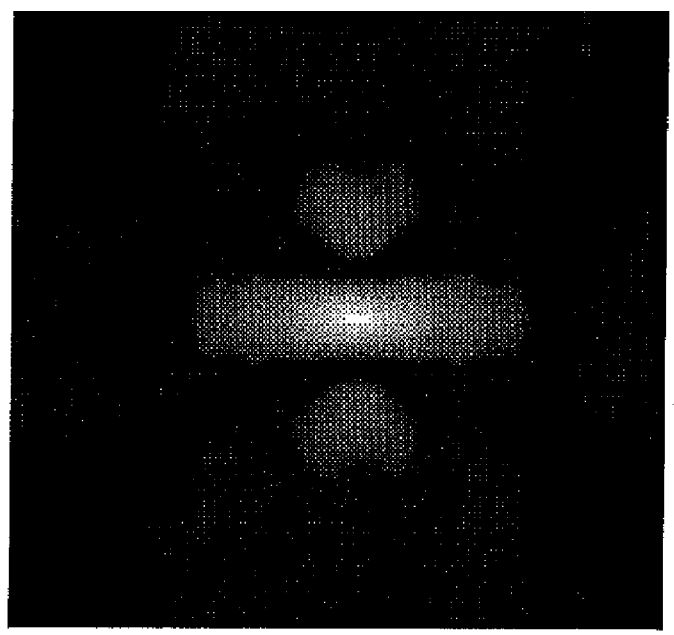
FIG. 2 is a picture, in a simulation pertaining to one example of a cavity within a 2D photonic crystal, showing the radiation pattern of light from the cavity, seen in the direction normal to the slab.
Figure 3:
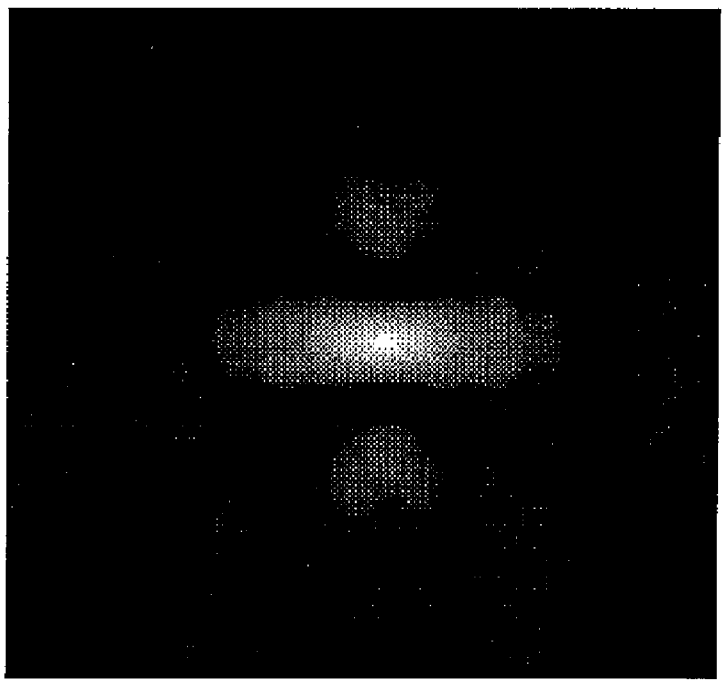
FIG. 3 is a picture, in a simulation pertaining to one example of a cavity according to the present invention, showing the radiation pattern of light from the cavity, seen in the direction normal to the slab.
Figure 4:
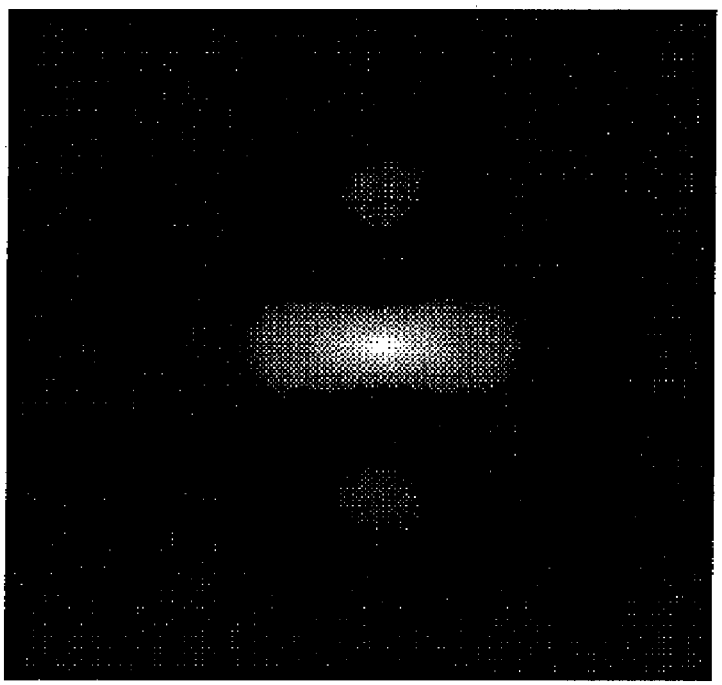
FIG. 4 is a picture, in a simulation pertaining to another example of a cavity according to the present invention, showing the radiation pattern of light from the cavity, seen in the direction normal to the slab.

For a case where every one of the through-holes 2 nearest the point defect 4 (the holes represented by dashed lines in FIG. 1) have a predetermined radius r=0.29 a that is identical to that of the other through-holes in the simulation under these conditions, a Q factor of 5200 was obtained; FIG. 2 shows the radiation pattern of light from the cavity 4 in this case, seen in the direction normal to the slab 1. For cases where the size of through-holes 2a and 2b that are at the lattice points nearest respective opposing ends of the point defect 4 (see FIG. 1) was changed from the predetermined radius r=0.29 a of the other through-holes to 0.19 a and further to 0.14 a in similar simulations, Q factors of 19,600 and 66,700, respectively, were obtained; FIGS. 3 and 4 respectively show the radiation patterns of light from the cavity 4 in these cases.

As will be understood from these simulations, in a donor-type point defect that contains three lattice points neighboring one another in a line-segment formation, changing the size of the through-hole neighboring both ends of the line segment from a predetermined radius r of 0.29 a of the other through-holes 2 to 0.14 a dramatically raises the Q factor from 5200 to 66,700 and meanwhile, as will be understood from a comparison between FIGS. 2 and 4, reduces the radiation angle of the light.

Figure 5:
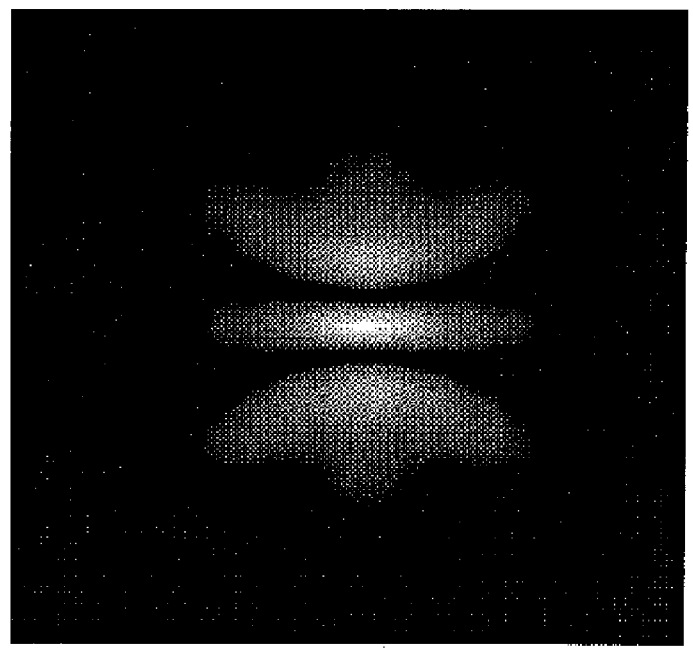
FIG. 5 is a picture, in a simulation pertaining to yet another example of a cavity according to the present invention, showing the radiation pattern of light from the cavity, seen in the direction normal to the slab.

In a further case, in which the radius of the through-holes 2a and 2b neighboring the respective ends of the point defect 4 was changed to 0.09 a, a still higher Q=103,900 was obtained; FIG. 5 shows the radiation pattern of light from the cavity in this case. Compared with FIG. 4, in FIG. 5 the radiation angle of the light is large, and side lobes (secondary beams) above and below the main emission beam in the center in FIG. 5 are conspicuous. This means that along with an enlargement of extent to which the size of the through-holes 2 nearest the point defect 4 is changed from the predetermined radius, the Q factor also trends to an enlarged value, but considered in terms of the radiation angle of the light from the cavity 4, extent of change in through-hole size should not necessarily be large.

Figure 6:
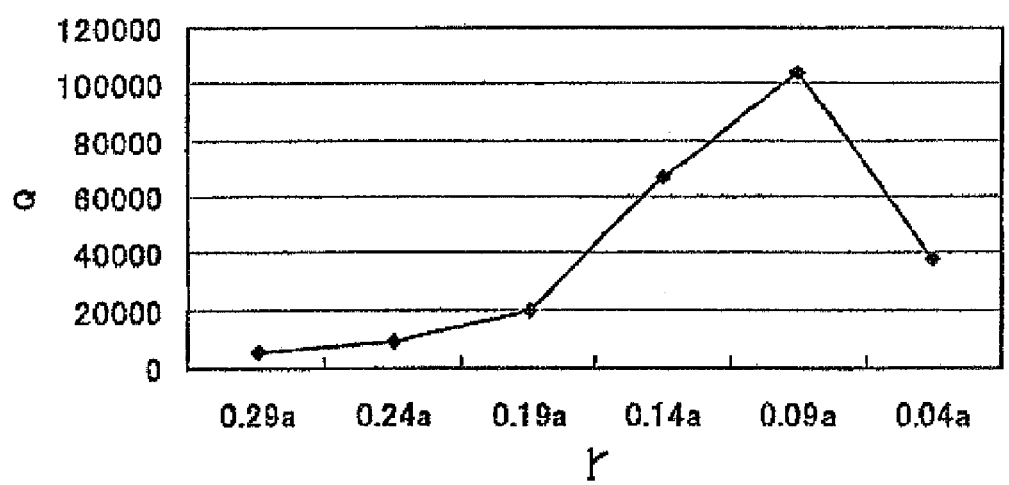
FIG. 6 is a graph that plots the relationship between Q factor and radius r of the through-holes nearest a point defect as illustrated in FIG. 1.

Reference is made to FIG. 6, which is a graph that plots the relationship between Q factor and radius r of the through-holes 2a and 2b nearest the point defect as illustrated in FIG. 1. In the graph, the horizontal axis represented the radius r of the through-holes nearest the point defect 4, scaled by the lattice constant a, while the vertical axis expresses Q factor. From FIG. 6 it will be understood that there is a limit to how far Q factor is enlarged by increasing extent to which the radius r of the nearest through-holes 2a and 2b is changed. Specifically, as the radius r is reduced to 0.09 a the Q factor increases exponentially also, reaching a maximum value of 103,900; but if the radius r is reduced further the Q factor on the contrary decreases sharply.

Figure 7:
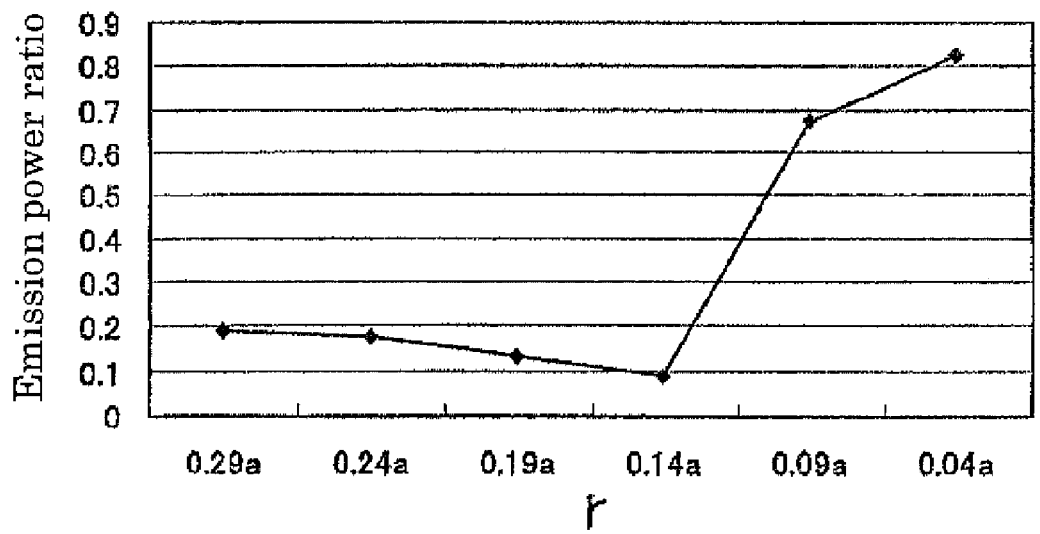
FIG. 7 is a graph that plots the power ratio of side lobes with respect to the main emission beam from a cavity, in relationship to radius r of the nearest through-hole.

In the FIG. 7 graph, the relationship between the radius r of the nearest through-holes 2a and 2b and the power ratio of side lobes, such as can be distinctly seen in FIG. 5, to the main emission beam is shown. In the graph, the horizontal axis indicates radius r of the nearest through-holes 2a and 2b, scaled by the lattice constant a, while the vertical axis expresses the ratio of side-lobe emission power to the main emission beam. In FIG. 7 it is evident that the emission-beam radiation angle containing the side lobes is smallest in the case where r=0.14 a, while it is greatest in the case where r=0.04 a.

A high Q=53,700 was also obtained in a case where the radius of all the through-holes 2 nearest the point defect 4, which are represented by the dashed lines in FIG. 1, was changed from 0.29 a to 0.19 a. In this case, however, the ratio of side-lobe emission power to the main emission beam emitted from the cavity 4 was very large, which is inadequate in terms of the radiation pattern.

Figure 8:
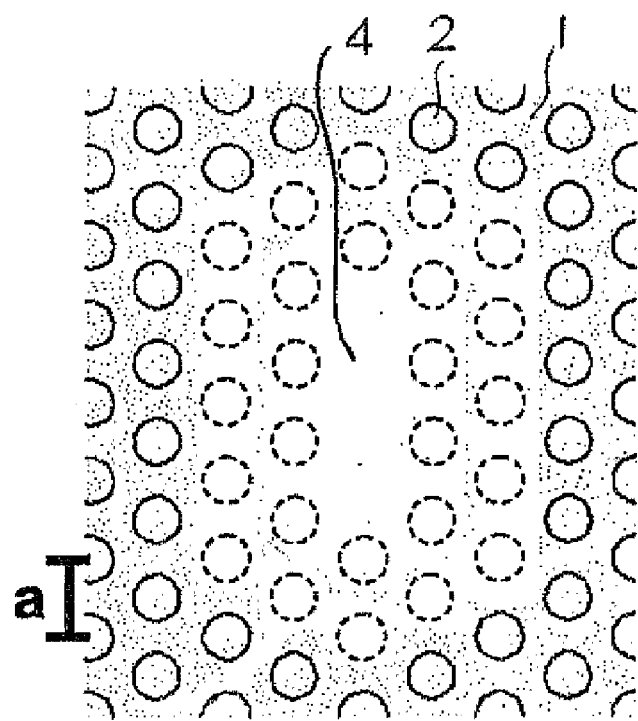
FIG. 8 is a plan view schematically illustrating a situation in which not only at least the radius of one of through-holes corresponding to the lattice points nearest a point defect, but also at least that of one of through-holes corresponding to the secondarily adjacent lattice points, is changed from a predetermined radius from its corresponding lattice point.

Reference is now made to FIG. 8, a schematic plan view that, while resembling FIG. 1, diagrammatically illustrates a case where not only at least one of the through-holes 2 (indicated by dashed lines) corresponding to the lattice points nearest the point defect 4, but also at least one of the through-holes 2 (indicated by dashed lines) corresponding to the secondarily adjacent lattice points, has a radius changed from the predetermined radius r of the other through-holes 2. Although what is most effective improving the Q factor of the cavity is as described above changing the radius r of through-holes 2 corresponding to the lattice points nearest the point defect 4 from the predetermined radius of the other through-holes 2, additionally changing the radius of through-holes 2 corresponding to the secondarily adjacent lattice points from the predetermined radius of the other through-holes 2 also produces an effect of bettering the Q factor.

It should be noted that the cavity 4 according to the present invention as described above is, as will be readily apparent to those skilled in the art, applicable to a channel add/drop filter such as illustrated in FIG. 10. It should also be understood that when a cavity 4 according to the present invention is to be adopted in a channel drop/add filter, a multi-channel add/drop filter that can handle optical communications in a plurality of channels differing from one another in wavelength can of course be created by disposing in proximity along a single waveguide a plurality of cavities differing from one another in resonant frequency. Also, by disposing the end face of an optical fiber to confront the cavity 4 proximately, the light emitted from the cavity 4 in the direction normal to the slab 1 can be introduced into the optical fiber. Furthermore, by disposing an optoelectronic transducer to confront the cavity 4 proximately intensity modulations in the light from the cavity can be received. It will be appreciated by those skilled in the art that a collimating lens (collimator) may be inserted in between the cavity 4 and either the optical-fiber end face or the optoelectronic transducer.

Figure 9:
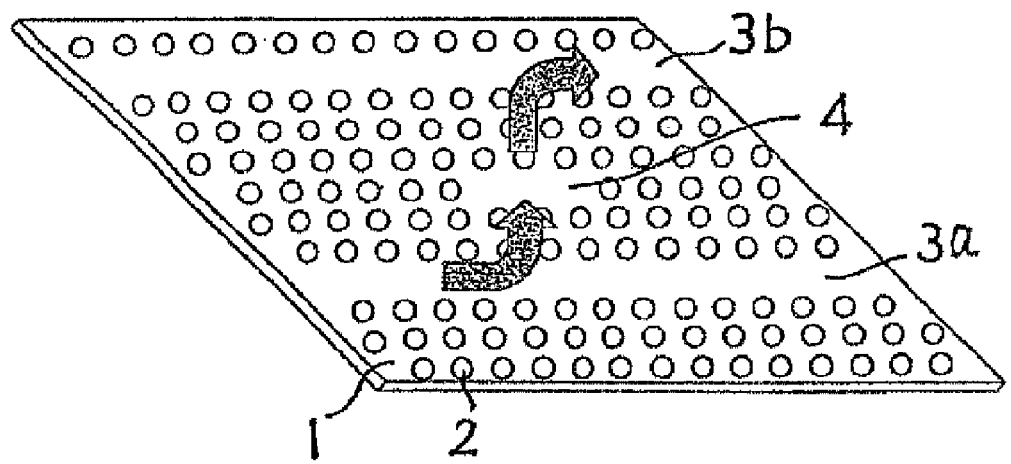
FIG. 9 is a schematic oblique view illustrating a channel add/drop filter in another example of an embodiment of the present invention.

Reference is now made to FIG. 9, schematically illustrating in an oblique view a channel add/drop filter in another example of an embodiment of the present invention. Although the channel add/drop filter of FIG. 9 resembles that of FIG. 10, in FIG. 9 a cavity 4 is disposed adjacent a first straight waveguide 3a and further, a second waveguide 3b is disposed adjacent the cavity 4. In this instance, as described earlier an optical signal of a specific wavelength can be extracted within the cavity 4 from optical signals introduced into the first waveguide 3a, but with the second waveguide 3b being disposed adjacent the cavity 4 the extracted optical signal is introduced from the cavity 4, not in the plane-normal of, but into the second waveguide 3b in, the slab 1. This means that in a channel add/drop filter employing a 2D photonic crystal, an optical signal of a given wavelength among optical signals that propagate through one waveguide can be selectively guided into another waveguide.

A material whose refractive index is large is desirable as the slab 1 for the photonic crystal, inasmuch as it must confine light along its thickness. In the embodiments described above, an Si (silicon) slab was utilized, but materials other than silicon that may be utilized include: Group IV semiconductors such as Ge, Sn, C and SiC; Group III-V semiconductor compounds such as GaAs, InP, GaN, GaP, AlP, AlAs, GaSb, InAs, AlSb, InSb, InGaAsP and AlGaAs; Group II-VI semiconductor compounds such as ZnS, CdS, ZnSe, HgS, MnSe, CdSe, ZnTe, MnTe, CdTe and HgTe; oxides such as $SiO_2$, $Al_2O_3$ and $TiO_2$; silicon nitride; various glass of all sorts, such as soda-lime glass; as well as organic substances such as PMMA (polymethylmethacrylate). In situations where amplification of optical signals in photonic crystals constituted from these slabs is desired they may be doped with Er, Tm, Alq3 ($C_{27}H_{18}AlN_3O_3$).

It is preferable that the refractive index of the slab 1 be, specifically, greater than air—2.0 or greater, with 3.0 or greater being more preferable. It will be appreciated by those skilled in the art that while air is present within the through-holes 2 in the embodiments described above, a substance of low refractive index relative to the slab 1 may of course be filled into the through-holes 2. A substance such as conducting polythiophene, for example, may be utilized as the low-refractive-index material. Furthermore, the two-dimensional lattice configured within the slab 1 is not limited to being a triangular lattice but can be configured as any other regular two-dimensional lattice of choice. And the cross section of the through-holes 2 is not limited to being round but may be other shapes; or the cross-sectional form may be varied along the slab thickness.

As given in the foregoing the present invention affords, in 2D photonic crystals, cavities in which the Q factor is heightened, and by combining a cavity of that sort with a waveguide, furthermore makes available channel add/drop filters having high wavelength resolution.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. In a two-dimensional photonic crystal configured by an arrangement, in a regular section of a two-dimensional lattice of points defined in a slab, of low-refractive-index substances having a small refractive index relative to the slab and being of predetermined identical dimension and shape, a non-graded cavity made from a point defect within the two-dimensional photonic crystal, wherein:

said point defect contains among said lattice points a plurality of three or more neighboring one another, and in said plurality of three or more lattice points said low-refractive-index substances are missing from said arrangement; and in said arrangement the two of said low-refractive-index substances being arranged to correspond to those of said lattice points being at the terminal ends of said point defect, and only those two of said low-refractive-index substances, are dimensionally altered from said predetermined dimension.

2. A cavity as set forth in claim 1, wherein said point defect contains six or fewer of said lattice points.

3. A cavity as set forth in claim 1, wherein the wavelength of light that resonates in said cavity is adjustable in dependency upon the dimension and shape of said point defect.

4. A cavity as set forth in claim 1, wherein said point defect contains said plurality of lattice points in a form in which said plurality is lined in a line segment.

5. A cavity as set forth in claim 1, wherein said low-refractive-index substances are filled into columns perforating said slab.

6. A cavity as set forth in claim 1, wherein the points in said two-dimensional lattice are arrayed in a triangular lattice.

7. A cavity as set forth in claim 1, wherein said slab has a refractive index of 2.0 or greater.

8. A cavity as set forth in claim 1, wherein said low-refractive-index substances are air.

9. In a two-dimensional photonic crystal, a channel add/drop filter comprising: at least one waveguide made from a line defect within said two-dimensional photonic crystal; and at least one cavity as set forth in claim 1, said cavity being disposed adjacent said waveguide, within a separation in which an electromagnetically reciprocal effect is produced between said cavity and said waveguide.

10. A channel add/drop filter as set forth in claim 9, comprising a plurality of said cavities, wherein said cavities differ from one another in resonant frequency.

11. In a two-dimensional photonic crystal configured by an arrangement, in a regular section of a two-dimensional lattice of points defined in a slab, of low-refractive-index substances having a small refractive index relative to the slab and being of predetermined identical dimension and shape, a non-graded cavity made from a point defect within the two-dimensional photonic crystal, wherein:

said point defect contains among said lattice points a plurality of three or more neighboring one another, and in said plurality of three or more lattice points said low-refractive-index substances are missing from said arrangement; and in said arrangement at least one of said low-refractive-index substances being arranged to correspond to at least one among those of said lattice points being nearest, and at least one of said low-refractive-index substances being arranged to correspond to at least one among those of said lattice points being secondarily adjacent—and only among those of said lattice points being nearest and being secondarily adjacent—said point defect are dimensionally altered from said predetermined dimension.

12. In a two-dimensional photonic crystal configured by an arrangement, in a regular section of a two-dimensional lattice of points defined in a slab, of low-refractive-index substances having a small refractive index relative to the slab and being of predetermined identical dimension and shape, a non-graded cavity made from a point defect within the two-dimensional photonic crystal, wherein:

said point defect contains among said lattice points a plurality of three or more neighboring one another, and in said plurality of three or more lattice points said low-refractive-index substances are missing from said arrangement; and in said arrangement those of said low-refractive-index substances being arranged to correspond to those of said lattice points including the terminal ends of said point defect, in parallel with the longitudinal orientation of the cavity and in a rectilinear form are dimensionally altered from said predetermined dimension.

* * * * *